US009590251B2

(12) United States Patent
Kose et al.

(10) Patent No.: US 9,590,251 B2
(45) Date of Patent: Mar. 7, 2017

(54) BINDER FOR STORAGE BATTERY DEVICE

(71) Applicant: ASAHI GLASS COMPANY, LIMITED, Chiyoda-ku (JP)

(72) Inventors: Takehiro Kose, Tokyo (JP); Mizuna Toyoda, Tokyo (JP); Hiroki Nagai, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/524,856

(22) Filed: Oct. 27, 2014

(65) Prior Publication Data

US 2015/0044561 A1 Feb. 12, 2015

Related U.S. Application Data

(63) Continuation of application No. PCT/JP2013/061948, filed on Apr. 23, 2013.

(30) Foreign Application Priority Data

Apr. 27, 2012 (JP) ................................. 2012-102713

(51) Int. Cl.
*H01M 4/62* (2006.01)
*C08F 214/18* (2006.01)
*C08K 3/20* (2006.01)
*C08F 214/26* (2006.01)
*H01G 11/86* (2013.01)
*H01G 11/38* (2013.01)
*H01M 4/04* (2006.01)
*H01M 10/0525* (2010.01)

(52) U.S. Cl.
CPC ......... *H01M 4/623* (2013.01); *C08F 214/184* (2013.01); *C08F 214/186* (2013.01); *C08F 214/188* (2013.01); *C08F 214/265* (2013.01); *C08F 214/267* (2013.01); *C08K 3/20* (2013.01); *H01G 11/38* (2013.01); *H01G 11/86* (2013.01); *H01M 4/0404* (2013.01); *H01M 10/0525* (2013.01); *H01M 2220/30* (2013.01); *Y02E 60/13* (2013.01)

(58) Field of Classification Search
CPC .............. C08F 214/184; C08F 214/186; C08F 214/188; C08F 214/265; C08F 214/267; C08K 3/20; H01G 11/38; H01G 11/86
See application file for complete search history.

(56) References Cited

U.S. PATENT DOCUMENTS

| | | | | |
|---|---|---|---|---|
| 5,565,284 A * | 10/1996 | Koga | ....................... | H01M 4/04 429/217 |
| 5,585,449 A * | 12/1996 | Arcella | .................. | C08F 214/18 526/247 |
| 7,544,753 B2 * | 6/2009 | Nomura | ................. | C08F 214/18 524/460 |
| 7,851,084 B2 * | 12/2010 | Sakuma | ................. | C08F 259/08 428/402.21 |
| 2010/0204423 A1 * | 8/2010 | Fukunaga | .............. | C08F 214/18 526/252 |
| 2011/0207889 A1 * | 8/2011 | Kose | ...................... | C08F 214/18 525/326.3 |
| 2012/0231332 A1 | 9/2012 | Kose | | |
| 2013/0330621 A1 | 12/2013 | Narumi et al. | | |
| 2014/0147745 A1 | 5/2014 | Toyoda et al. | | |
| 2014/0363715 A1 | 12/2014 | Toyoda et al. | | |

FOREIGN PATENT DOCUMENTS

| | | |
|---|---|---|
| EP | 1 783 146 A1 | 5/2007 |
| EP | 1 808 448 A1 | 7/2007 |
| EP | 2 343 325 A1 | 7/2011 |
| JP | 2002-42817 | 2/2002 |
| JP | 2006-236866 A | 9/2006 |
| JP | 2009-29892 A | 2/2009 |
| JP | 2011-134618 | 7/2011 |
| JP | 2011-134649 | 7/2011 |
| WO | 2011/055760 | 5/2011 |
| WO | WO 2012/043765 A1 | 4/2012 |
| WO | 2012/111770 | 8/2012 |
| WO | 2013/018664 | 2/2013 |

OTHER PUBLICATIONS

"Vinyl Esters", Sigma Aldrich, http://www.sigmaaldrich.com/materials-science/material-science-products.html?TablePage=16371054, 2016.*
U.S. Appl. No. 14/657,475, filed Mar. 13, 2015, Kose, et al.
International Search Report issued Jul. 30, 2013 in PCT/JP2013/061948 filed Apr. 23, 2013.

* cited by examiner

*Primary Examiner* — Nicole M Buie-Hatcher
(74) *Attorney, Agent, or Firm* — Oblon, McClelland, Maier & Neustadt, L.L.P.

(57) ABSTRACT

To provide a binder for a storage battery device whereby favorable adhesion is obtainable and swelling by an electrolytic solution can favorably be suppressed. A binder for a storage battery device, which is made of a fluorinated copolymer comprising structural units (A), structural units (B) and structural units (C), wherein the molar ratio of the structural units (C) to the total of all the structural units excluding the structural units (C) is from 0.01/100 to 3/100: structural units (A): structural units derived from a monomer selected from the group consisting of tetrafluoroethylene, hexafluoropropylene, vinylidene fluoride and chlorotrifluoroethylene; structural units (B): structural units derived from ethylene or propylene; and structural units (C): structural units derived from a $C_{5-30}$ organic compound having at least two double bonds and at least one of the double bonds being a double bond of a vinyl ether group or a double bond of a vinyl ester group.

13 Claims, No Drawings

BINDER FOR STORAGE BATTERY DEVICE

TECHNICAL FIELD

The present invention relates to a binder for a storage battery device, a binder composition for a storage battery device, an electrode mixture for a storage battery device, an electrode for a storage battery device and a secondary battery.

BACKGROUND ART

A fluorinated copolymer is excellent in voltage resistance, oxidation resistance and chemical resistance. Accordingly, use as a binder in a storage battery device such as a capacitor, a primary battery or a secondary battery for an electronic device or an electric car, for which a high output power, a high capacity and excellent cycle characteristics are required, has been proposed.

For example, Patent Document 1 discloses an example wherein a secondary battery was prepared by using, as a binder, a fluorinated copolymer which is a copolymer of tetrafluoroethylene and propylene, wherein the molar ratio of structural units derived from tetrafluoroethylene/structural units derived from propylene was 56/44.

Further, Patent Document 2 proposes a binder containing a water-soluble polymer material (preferably water-soluble cellulose) which will not swell in an electrolytic solution and a fluororesin (such as polytetrafluoroethylene or tetrafluoroethylene/hexafluoropropylene) to impart flexibility to the positive electrode.

The binder as disclosed in Patent Document 2 is less likely to swell or be dissolved in an electrolytic solution, and a decrease in the bonding property is suppressed, and accordingly it is considered that a lithium ion secondary battery having favorable cycle characteristic and high temperature property is obtained with such a binder.

However, the binder used in Examples in Patent Document 1 is excellent in the adhesion but is not insufficient in view of suppression of swelling in an electrolytic solution (electrolytic solution resistance).

Further, with respect to the binder as disclosed in Patent Document 2, since the adhesion of the fluororesin contained in the binder is low, the electrode active material fixed to the electrode is likely to fall down.

PRIOR ART DOCUMENTS

Patent Documents

Patent Document 1: WO2011/055760
Patent Document 2: JP-A-2002-42817

DISCLOSURE OF INVENTION

Technical Problem

It is an object of the present invention to provide a binder for a storage battery device, whereby favorable adhesion is obtainable, swelling in an electrolytic solution is favorable suppressed, and it is possible to realize favorable charge and discharge characteristics in a secondary battery, and a binder composition for a storage battery device, an electrode mixture for a storage battery device, an electrode for a storage battery device and a secondary battery, using such a binder.

Solution to Problem

The present invention provides a binder for a storage battery device, a binder composition for a storage battery device, an electrode mixture for a storage battery device, an electrode for a storage battery device and a secondary battery, having the following constructions [1] to [14].

[1] A binder for a storage battery device, which is made of a fluorinated copolymer comprising the following structural units (A), the following structural units (B) and the following structural units (C), wherein the molar ratio of the structural units (C) to the total of all the structural units excluding the structural units (C) is from 0.01/100 to 3/100:

structural units (A): structural units derived from a monomer selected from the group consisting of tetrafluoroethylene, hexafluoropropylene, vinylidene fluoride and chlorotrifluoroethylene;

structural units (B): structural units derived from a monomer selected from the group consisting of ethylene and propylene; and structural units (C): structural units derived from a monomer selected from $C_{5-30}$ organic compounds having at least two double bonds and at least one of the double bonds being a double bond of a vinyl ether group represented by the following formula (1) or a double bond of a vinyl ester group represented by the following formula (2):

$$CY^1Y^2\!=\!Y^3\!-\!O\!-\!\qquad(1)$$ 

wherein each of $Y^1$, $Y^2$ and $Y^3$ which are independent of one another, is a hydrogen atom, a halogen atom or a $C_{1-10}$ alkyl group;

$$CZ^1Z^2\!=\!CZ^3\!-\!OCO\!-\!\qquad(2)$$ 

wherein each of $Z^1$, $Z^2$ and $Z^3$ which are independent of one another, is a hydrogen atom, a halogen atom or a $C_{1-10}$ alkyl group.

[2] The binder for a storage battery device according to [1], wherein the vinyl ether group represented by the formula (1) is $CH_2\!=\!CH\!-\!O\!-\!$, and the vinyl ester group represented by the formula (2) is $CH_2\!=\!CH\!-\!OCO\!-\!$.

[3] The binder for a storage battery device according to [1] or [2], wherein the organic compound having at least two double bonds is a compound represented by the following formula (I), (II) or (III):

$$CR^1R^2\!=\!CR^3\!-\!O\!-\!R^4\!-\!O\!-\!CR^5\!=\!CR^6R^7 \qquad(I)$$ 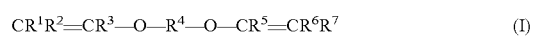

$$CR^8R^9\!=\!CR^{10}\!-\!OCO\!-\!R^{11}\!-\!COO\!-\!$$
$$CR^{12}\!=\!CR^{13}R^{14} \qquad(II)$$ 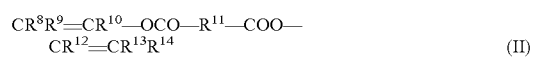

$$CR^{15}R^{16}\!=\!CR^{17}COOCH\!=\!CH_2 \qquad(III)$$ 

wherein each of $R^1$, $R^2$, $R^3$, $R^5$, $R^6$, $R^7$, $R^8$, $R^9$, $R^{10}$, $R^{12}$, $R^{13}$, $R^{14}$ and $R^{17}$ which are independent of one another, is a hydrogen atom, a fluorine atom or a methyl group, each of $R^4$ and $R^{11}$ is a $C_{1-10}$ alkylene group which may contain an etheric oxygen atom, and each of $R^{15}$ and $R^{16}$ which are independent of each other, is a hydrogen atom or a $C_{1-10}$ alkyl group which may contain an etheric oxygen atom.

[4] The binder for a storage battery device according to any one of [1] to [3], wherein the organic compound having at least two double bonds is 1,4-butanediol divinyl ether, divinyl adipate, vinyl crotonate or vinyl methacrylate.

[5] The binder for a storage battery device according to any one of [1] to [4], wherein the molar ratio (A)/(B) of the structural units (A) to the structural units (B) is from 30/70 to 90/10.

[6] The binder for a storage battery device according to any one of [1] to [5], wherein the fluorinated copolymer contains structural units derived from tetrafluoroethylene and/or vinylidene fluoride and structural units derived from propylene.

[7] The binder for a storage battery device according to any one of [1] to [5], wherein the fluorinated copolymer contains structural units derived from tetrafluoroethylene and structural units derived from propylene.

[8] A binder composition for a storage battery device, which contains the binder for a storage battery device as defined in any one of [1] to [7] and a liquid medium.

[9] The binder composition for a storage battery device according to [8], wherein the liquid medium is an aqueous medium, and particles made of the fluorinated copolymer are dispersed in the aqueous medium.

[10] The binder composition for a storage battery device according to [8] or [9], which is a latex of the fluorinated copolymer obtained by emulsion polymerization of the monomers.

[11] An electrode mixture for a storage battery device, which comprises the binder composition for a storage battery device as defined in any one of [8] to [10] and an electrode active material.

[12] An electrode for a storage battery device, which comprises a current collector and, formed on the current collector, an electrode active material layer comprising the binder for a storage battery device as defined in any one of [1] to [7] and an electrode active material.

[13] A method for producing an electrode for a storage battery device as defined in [12], which comprises applying the electrode mixture as defined in [11] to the current collector to form a layer of the electrode mixture, and then removing the liquid medium from the layer of the electrode mixture to form an electrode active material layer.

[14] A secondary battery comprising the electrode for a storage battery device as defined in [12] and an electrolytic solution.

Advantageous Effects of Invention

According to the binder for a storage battery device of the present invention, favorable adhesion is obtainable, swelling by an electrolytic solution is favorably suppressed, and it is possible to obtain favorable charge and discharge characteristics in a secondary battery.

According to the binder composition for a storage battery device of the present invention, favorable adhesion is obtainable, swelling of the binder for a storage battery device by an electrolytic solution is favorable suppressed, and it is possible to obtain favorable charge and discharge characteristics in a secondary battery.

According to the electrode mixture for a storage battery device of the present invention, favorable adhesion in electrode active material and adhesion between electrode active material and a current collector are obtainable, swelling of the binder for a storage battery device by an electrolytic solution is favorable suppressed, and it is possible to obtain favorable charge and discharge characteristics in a secondary battery.

According to the electrode for a storage battery device of the present invention, favorable adhesion in electrode active material and adhesion between electrode active material and a current collector are obtainable, swelling of the binder for a storage battery device by an electrolytic solution is favorably suppressed, and it is possible to obtain favorable charge and discharge characteristics in a secondary battery.

According to the secondary battery of the present invention, adhesion in electrode active material and adhesion between electrode active material and a current collector are obtainable, swelling of the binder for a storage battery device by an electrolytic solution is favorably suppressed, and it is possible to obtain favorable charge and discharge characteristics.

DESCRIPTION OF EMBODIMENTS

In this specification, the storage battery device may, for example, be a lithium-ion primary battery, a lithium-ion secondary battery, a lithium polymer battery, an electrolytic double layer capacitor or a lithium-ion capacitor. The storage battery device is particularly preferably a lithium-ion secondary battery since the adhesion, the electrolytic solution resistance, the charge and discharge characteristics, etc. can thereby be effectively obtainable.

<Binder for Storage Battery Device>

Hereinafter tetrafluoroethylene will be referred to as TFE, hexafluoropropylene HFP, vinylidene fluoride VdF, chlorotrifluoroethylene CTFE, perfluoro(alkyl vinyl ether) PAVE, perfluoro(methyl vinyl ether) PMVE, perfluoro(propyl vinyl ether) PPVE, ethylene E and propylene P.

The structural unit means a unit in a polymer, formed by polymerization of a monomer.

Further, the monomer selected from the group consisting of tetrafluoroethylene, hexafluoropropylene, vinylidene fluoride and chlorotrifluoroethylene, which is a monomer constituting each structural unit (A), will be hereinafter sometimes referred to as monomer (a). Likewise, the monomer selected from the group consisting of ethylene and propylene, which is a monomer constituting each structural unit (B) will be sometimes referred to as monomer (b), and an organic compound having at least two double bonds, which is a monomer constituting each structural unit (C), will be sometimes referred to as monomer (c).

The binder for a storage battery device of the present invention is made of a fluorinated copolymer comprising structural units (A) derived from the monomer (a), structural units (B) derived from the monomer (b) and structural units (C) derived from the monomer (c).

The structural units (A) are structural units formed by polymerization of a monomer selected from the group consisting of TFE, HFP, VdF and CTFE. Among them, more preferred are structural units derived from a monomer selected from the group consisting of TFE, HFP and VdF, whereby swelling of the fluorinated copolymer by an electrolytic solution is favorably obtained, and favorable charge and discharge characteristics are obtained, and most preferred are structural units derived from TFE. Further, the fluorinated copolymer may have at least two types of structural units (A) derived from at least two monomers among the above.

The structural units (B) are structural units formed by polymerization of a monomer selected from the group consisting of E and P. The structural units (B) are preferably structural units derived from P in view of favorable flexibility and adhesion of the fluorinated copolymer. The fluorinated copolymer may have both of structural units derived from P and structural units derived from E as the structural units (B).

In the fluorinated copolymer, the molar ratio [(A)/(B)] of the structural units (A) to the structural units (B) is preferably from 30/70 to 90/10, more preferably from 30/70 to 80/20, further preferably from 30/70 to 70/30, most preferably from 40/60 to 60/40. Within such a range, favorable adhesion (bonding property) and excellent electrolytic solution resistance (suppression of swelling) tend to be readily simultaneously obtainable when used as a binder for a storage battery device.

The structural units (C) are structural units formed by polymerization of a monomer using as the monomer a compound selected from the following organic compound. Such an organic compound is a $C_{5-30}$ organic compound having at least two double bonds and at least one of the double bonds being a double bond of a vinyl ether group represented by the above formula (1) or a double bond of a vinyl ester group represented by the above formula (2). Here, the fluorinated copolymer may have at least two types of structural units (C) derived from at least two types of the organic compounds.

By copolymerizing the monomer (c) which is the above organic compound having at least two double bonds with the monomer (a) or the monomer (b), a fluorinated copolymer having a crosslinked structure is obtained. Particularly a double bond of a vinyl ether group or a double bond of a vinyl ester group is excellent in the reactivity with a fluorinated monomer such as the monomer (a) or the aftermentioned monomer (d).

The number of carbon atoms of the organic compound having at least two double bonds is from 5 to 30, preferably from 5 to 20, more preferably from 5 to 15. When the number of carbon atoms is at most the upper limit of the above range, swelling by the electrolytic solution will favorably be suppressed.

In the formula (1), the number of carbon atoms of the alkyl group as each of $Y^1$, $Y^2$ and $Y^3$ is preferably from 1 to 10, more preferably from 1 to 5. The halogen atom as each of $Y^1$, $Y^2$ and $Y^3$ is preferably a fluorine atom.

In the formula (2), the number of carbon atoms of the alkyl group as each of $Z^1$, $Z^2$ and $Z^3$ is preferably from 1 to 10, more preferably from 1 to 5. The halogen atom as each of $Z^1$, $Z^2$ and $Z^3$ is preferably a fluorine atom.

The vinyl ether group represented by the formula (1) is preferably $CH_2$=CH—O—, and the vinyl ester group represented by the formula (2) is preferably $CH_2$=CH—OCO—.

The number of double bonds in the organic compound having at least two double bonds is preferably from 2 to 4, particularly preferably 2. Further, at least one of the double bonds is the double bond of a vinyl ether group or the double bond of a vinyl ester group. At least one of groups having a double bond in the organic compound may be a group other than the vinyl ether group and the vinyl ester group. The group other than the vinyl ether group and the vinyl ester group may, for example, be an alkenyl ether group other than the vinyl ether group, such as an allyl ether group, a 3-butenyl ether group or a 2-butenyl ether group, an alkenyloxycabonyl group other than the vinyl ester group, such as an allyloxycarbonyl group, a 3-butenyloxycarbonyl group or a 2-butenyloxycarbonyl group, or an unsaturated acyl group having a polymerizable double bond such as an acryloyl group, a methacryloyl group or a crotonyl group. Such a group other than the vinyl ether group and the vinyl ester group, preferred is a group having at most 6 carbon atoms.

The organic compound having at least two double bonds is preferably an organic compound having two double bonds, such as a compound having two vinyl ether groups, a compound having two vinyl ester groups, a compound having one vinyl ether group and one vinyl ester group, a compound having one group having a double bond other than the vinyl ether group and the vinyl ester group, and one vinyl ether group, or a compound having one group having a double bond other than the vinyl ether group and the vinyl ester group, and one vinyl ester group.

The organic compound having at least two double bonds is preferably an organic compound selected from the group consisting of an organic compound represented by the following formula (I), an organic compound represented by the following formula (II) and an organic compound represented by the following formula (III):

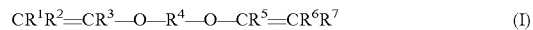

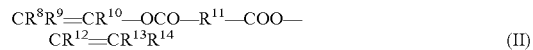

wherein each of $R^1$, $R^2$, $R^3$, $R^5$, $R^6$, $R^7$, $R^8$, $R^9$, $R^{10}$, $R^{12}$, $R^{13}$, $R^{14}$ and $R^{17}$ which are independent of one another, is a hydrogen atom, a fluorine atom or a methyl group, each of $R^4$ and $R^{11}$ is a $C_{1-10}$ alkylene group which may contain an etheric oxygen atom, and each of $R^{15}$ and $R^{16}$ which are independent of each other, is a hydrogen atom or a $C_{1-10}$ alkyl group which may contain an etheric oxygen atom.

The organic compound represented by the formula (I) may be one wherein some or all of $R^1$, $R^2$, $R^3$, $R^5$, $R^6$ and $R^7$ are a fluorine atom, an alkyl group or the like, but preferred is a compound wherein all of $R^1$, $R^2$, $R^3$, $R^5$, $R^6$ and $R^7$ are a hydrogen atom. Further, $R^4$ is preferably a O2-6 alkylene group, more preferably a O2-6 polymethylene group. Specific examples of a particularly preferred organic compound represented by the formula (I) include 1,4-butanediol divinyl ether.

The organic compound represented by the formula (II) may be a compound wherein some or all of $R^8$, $R^9$, $R^{10}$, $R^{12}$, $R^{13}$ and $R^{14}$ are a fluorine atom, but preferred is a compound wherein all of $R^8$, $R^9$, $R^{10}$, $R^{12}$, $R^{13}$ and $R^{14}$ are a hydrogen atom. $R^{11}$ is preferably a $C_{1-6}$ alkylene group, more preferably a $C_{2-6}$ polymethylene group. Specific examples of a particularly preferred organic compound represented by the formula (II) include divinyl adipate.

In the organic compound represented by the formula (III), it is preferred that $R^{16}$ and $R^{17}$ are a hydrogen atom. Specific examples of the organic compound represented by the formula (III) include vinyl crotonate and vinyl methacrylate, and particularly preferred is vinyl crotonate.

The fluorinated copolymer may have, in addition to the structural units (A) to (C), at least one type of structural units (D) derived from a monomer (d) selected from PAVE (perfluoro(alkyl vinyl ether)). The structural units (D) in the fluorinated copolymer are not essential, but by the structural units (D), flexibility of the fluorinated copolymer will more improve, and swelling by the electrolytic solution will be more suppressed.

PAVE is preferably a monomer represented by the following formula (IV):

wherein $R^f$ is a $C_{1-8}$ perfluoroalkyl group or a $C_{1-8}$ perfluoroalkyl group having an etheric oxygen atom.

$R^f$ has preferably from 1 to 6, more preferably from 1 to 5 carbon atoms.

Specific examples of PAVE include PMVE, PPVE, perfluoro(3,6-dioxa-1-heptene), perfluoro(3,6-dioxa-1-octene) and perfluoro(5-methyl-3,6-dioxa-1-nonene).

In a case where the fluorinated copolymer has structural units (D), the ratio of the structural units (D) to the total of all the structural units excluding the structural units (C) is preferably from 0.01 to 40 mol %, more preferably from 0.1 to 20 mol %. When the ratio is at least the lower limit of the above range, effects by incorporating the structural units (D) tend to be sufficiently obtained. When it is at most the upper limit of the above range, favorable adhesion in electrode active material and adhesion between electrode active material and a current collector are obtainable, swelling of the fluorinated copolymer by the electrolytic solution will favorably be suppressed, and favorable charge and discharge characteristics will be obtained.

The fluorinated copolymer may have, in addition to the structural units (A) to (D), structural units (E) derived from a monomer (e) which are structural units other than the structural units (A) to (D), within a range not to impair the effects of the present invention. Such a monomer (e) is a monomer other than the monomers (a) to (d).

The monomer (e) may, for example, be a fluorinated monomer such as vinyl fluoride, pentafluoropropylene, perfluorocyclobutene or a (perfluoroalkyl)ethylene such as $CH_2=CHCF_3$, $CH_2=CHCF_2CF_3$, $CH_2=CHCF_2CF_2CF_3$, $CH_2=CHCF_2CF_2CF_2CF_3$, $CH_2=CHCF_2CF_2CF_2CF_2CF_3$; or a non-fluorinated monomer such as an α-olefin such as isobutylene or pentene, a vinyl ether such as methyl vinyl ether, ethyl vinyl ether, propyl vinyl ether or butyl vinyl ether, or a vinyl ester such as vinyl acetate, vinyl propionate, vinyl butyrate, vinyl caproate or vinyl caprylate.

In the fluorinated copolymer, the ratio of the structural units (E) to the total of all the structural units excluding the structural units (C) is preferably at most 10 mol %, more preferably at most 5 mol %.

In the fluorinated copolymer, the molar ratio of the structural units (C) to the total of all the structural units excluding the structural units (C) (the total of the structural units (A), (B), (D) and (E)) is from 0.01/100 to 3.0/100. When the molar ratio is at least 0.01/100, swelling of the obtainable binder for a storage battery device by the electrolytic solution will favorably be suppressed, and favorable charge and discharge characteristics in a secondary battery tend to be obtained. The reason why such effects are obtained is considered that the crosslinked structure formed by copolymerization of the monomer (c) contributes to suppression of the swelling.

When the molar ratio is at most 3/100, favorable adhesion of the binder for a storage battery device will be obtained, and favorable charge and discharge characteristics in a secondary battery are likely to be obtained. Further, double bonds in the monomer (c) are less likely to remain in an unreacted state. Remaining of unreacted double bonds in the fluorinated copolymer is preferably smaller, whereby deterioration of an electrode by oxidation of the double bonds is less likely to occur.

The lower limit of the molar ratio is preferably at least 0.01/100, more preferably at least 0.02/100, particularly preferably at least 0.05/100.

The upper limit of the molar ratio is preferably at most 1.5/100, more preferably at most 0.8/100, further preferably at most 0.5/100, particularly preferably at most 0.2/100. When it is at most 0.5/100, favorable flexibility of the binder for a storage battery device tends to be readily obtainable and favorable adhesion tends to be readily obtainable.

In the fluorinated copolymer, specific examples of the combination of the structural units (A), (B) and (D) include the following (X1) to (X9). Preferred are (X1) to (X4), and most preferred are (X1) and (X2), whereby favorable adhesion (bonding property) and excellent flexibility tend to readily simultaneously obtainable when the obtainable fluorinated copolymer is used as a binder for a storage battery device.

The structural units (C) to be combined with each of the following (X1) to (X9) are not particularly limited, and the above preferred structural units (C) are preferably combined.

(X1) A combination of structural units derived from TFE and structural units derived from P.

(X2) A combination of structural units derived from TFE, structural units derived from P and structural units derived from VdF.

(X3) A combination of structural units derived from TFE, structural units derived from P and structural units derived from PPVE.

(X4) A combination of structural units derived from TFE, structural units derived from P and structural units derived from PMVE.

(X5) A combination of structural units derived from TFE, structural units derived from P and structural units derived from HFP.

(X6) A combination of structural units derived from TFE, structural units derived from E and structural units derived from P.

(X7) A combination of structural units derived from TFE, structural units derived from E and structural units derived from PMVE.

(X8) A combination of structural units derived from TFE, structural units derived from E and structural units derived from PPVE.

(X9) A combination of structural units derived from HFP and structural units derived from E.

In combinations (X1) to (X4), a preferred molar ratio of the respective structural units is as follows, whereby favorable adhesion (bonding property) and excellent flexibility tend to be readily simultaneously obtainable when used as a binder for a storage battery device.

(X1): Structural units derived from TFE/structural units derived from P=40/60 to 60/40 (molar ratio)

(X2): Structural units derived from TFE/structural units derived from P/structural units derived from VdF=30 to 60/20 to 60/1 to 40 (molar ratio)

(X3): Structural units derived from TFE/structural units derived from P/structural units derived from PPVE=30 to 60/10 to 40/10 to 40 (molar ratio) (X4): Structural units derived from TFE/structural units derived from P/structural units derived from PMVE=30 to 60/10 to 40/10 to 40 (molar ratio)

The Mooney viscosity of the fluorinated copolymer is preferably from 5 to 200, more preferably from 10 to 170, most preferably from 20 to 100.

The Mooney viscosity is measured in accordance with JIS K6300 by using an L-type rotor having a diameter of 38.1 mm and a thickness of 5.54 mm at 121° C. by setting a preheating time to be 1 minute and a rotor rotational time to be 10 minutes, and it is an index for a molecular weight of a polymer material such as a rubber. The value of the Mooney viscosity being large indirectly indicates that the molecular weight is high. When the Mooney viscosity is within a range of from 5 to 200, favorable adhesion (bonding property) and excellent electrolytic solution resistance (suppression of swelling) tend to be readily simultaneously obtainable when used as a binder for a storage battery device.

The binder for a storage battery device of the present invention is made of a fluorinated copolymer comprising the structural units (A) to (C), and it is considered that particularly by containing the structural units (C), the crosslinked structure in the fluorinated copolymer is formed, whereby swelling by the electrolytic solution can be suppressed.

Further, it is considered that by the molar ratio of the structural units (C) in the fluorinated copolymer being within a specific range, both favorable adhesion and excellent electrolytic solution resistance can be obtained when used as a binder for a storage battery device, without impairing the flexibility of the fluorinated copolymer by the crosslinked structure.

<Method for Producing Fluorinated Copolymer>

As the method for producing the fluorinated copolymer, an emulsion polymerization method, a solution polymerization method, a suspension polymerization method or a bulk polymerization method may, for example, be mentioned. Preferred is an emulsion polymerization method of copolymerizing monomers in an aqueous medium in the presence of an emulsifier in view of easy control of the molecular weight (Mooney viscosity) of the fluorinated copolymer and the copolymer composition and excellent productivity.

In the emulsion polymerization method, the fluorinated copolymer latex is obtained via an emulsion polymerization step wherein in the presence of an aqueous medium, an emulsifier and a radical polymerization initiator, a mixture of monomers is subjected to emulsion polymerization to form a fluorinated copolymer. A pH-adjusting agent may be added in the emulsion polymerization step.

(Aqueous Medium)

The aqueous medium may be water alone, or a mixture of water and a water-soluble organic solvent. As the water-soluble organic solvent, a known compound may suitably be used which is soluble in water at an optional proportion. The water-soluble organic solvent is preferably an alcohol, such as tert-butanol, propylene glycol, dipropylene glycol, dipropylene glycol monomethyl ether or tripropylene glycol. Among them, preferred is tert-butanol, propylene glycol or dipropylene glycol monomethyl ether.

The content of the water-soluble organic solvent in the aqueous medium should better be small. Specifically, the water-soluble organic solvent is less than 5 parts by mass, preferably at most 1 part by mass, more preferably at most 0.5 part by mass, per 100 parts by mass of water.

When the content of the water-soluble organic solvent is within the above-mentioned range, in a case where the obtainable fluorinated copolymer latex is used as a binder composition for a storage battery device, handling for e.g. operation environmental measures may be simplified depending upon the production process, such being desirable.

(Emulsifier)

As the emulsifier, a known emulsifier which is used in an emulsion polymerization method, may be suitably used. An ionic emulsifier is preferred, and an anionic emulsifier is more preferred, in that the mechanical and chemical stability of the latex will be thereby excellent.

As the anionic emulsifier, a conventional emulsifier known in an emulsion polymerization method, may be used. Specific examples include a hydrocarbon type emulsifier such as sodium lauryl sulfate, sodium dodecylbenzene sulfonate, a sodium alkyl sulfonate, a sodium alkylbenzene sulfonate, a sodium succinic acid dialkyl ester sulfonate or a sodium alkyldiphenyl ether disulfonate; a fluorinated alkylcarboxylate such as ammonium perfluorooctanoate or ammonium perfluorohexanoate; and a compound represented by the following formula (V) (hereinafter referred to as a compound (V)).

$$F(CF_2)_pO(CF(X)CF_2O)_qCF(X)COOA \quad (V)$$

In the formula (V), X is a fluorine atom or a $C_{1-3}$ perfluoroalkyl group, A is a hydrogen atom, an alkali metal atom or $-NH_4$, p is an integer of from 1 to 10, and q is an integer of 0 or from 1 to 3.

In the compound (V), X is preferably a fluorine atom or a trifluoromethyl group, A is preferably Na or $-NH_4$, p is preferably from 1 to 5, and q is preferably 1 or 2.

As the anionic emulsifier, sodium lauryl sulfate is particularly preferred, since the polymerization properties and dispersion stability will be thereby excellent, and it is inexpensive.

The amount of the anionic emulsifier to be used is preferably from 1.5 to 5.0 parts by mass, more preferably from 1.5 to 3.8 parts by mass, particularly preferably from 1.7 to 3.2 parts by mass, per 100 parts by mass of the fluorinated copolymer to be formed in the emulsion polymerization step.

When the content of the emulsifier in the fluorinated copolymer latex obtainable by emulsion polymerization is within such a range, the latex will be excellent in stability, and when such a latex is used as a binder composition for a storage battery device, excellent charge and discharge characteristics tend to be readily obtainable.

(pH-Adjusting Agent)

The pH-adjusting agent is preferably an inorganic salt, and a known inorganic salt may be used as the pH-adjusting agent in the emulsion polymerization. The pH-adjusting agent may specifically be e.g. a phosphoric acid salt such as disodium hydrogenphosphate or sodium dihydrogenphosphate; or a carbonic acid salt such as sodium hydrogencarbonate or sodium carbonate. A more preferred specific example of the phosphoric acid salt may, for example, be disodium hydrogenphosphate dihydrate or disodium hydrogenphosphate dodecahydrate. Further, in order to adjust the pH to a desired level, a base such as sodium hydroxide or potassium hydroxide, or an acid such as sulfuric acid, hydrochloric acid or nitric acid may be used in combination.

The pH in the aqueous medium in the after-described emulsion polymerization step is preferably from 4 to 12, more preferably 6 to 11.

By addition of the pH-adjusting agent, the polymerization rate and the stability of the obtainable latex can be improved.

(Radical Polymerization Initiator)

As the radical polymerization initiator, a water-soluble polymerization initiator may optionally be used. The water-soluble polymerization initiator may, for example, be a persulfate or a water-soluble organic peroxide. Specifically, the persulfate may, for example, be ammonium persulfate, sodium persulfate or potassium persulfate, and the water-soluble organic peroxide may, for example, be disuccinic acid peroxide or azobisisobutylamidine dihydrochloride. Among them, a persulfate is preferred, and ammonium persulfate is particularly preferred.

The mechanism to initiate a radical polymerization reaction may be (1) a heat decomposition polymerization initiator system wherein heat is applied in the presence of a radical polymerization initiator to cause radical decomposition, or (2) a redox polymerization initiator system wherein a radical polymerization initiator and an oxidation-reduction catalyst (so-called redox catalyst) are used in combination.

In either system, the amount of the radical polymerization initiator to be used is preferably from 0.0001 to 3 parts by mass, more preferably from 0.001 to 1 part by mass, per 100 parts by mass of the fluorinated copolymer to be formed in the emulsion polymerization step.

As the radical polymerization initiator to be used in (1) the heat decomposition polymerization initiator system, a water-soluble initiator of which one hour half-life temperature is from 50 to 100° C., may be employed. It may be suitably selected for use among water-soluble initiators which are commonly used for usual emulsion polymerization.

As the radical polymerization initiator and the redox catalyst used in (2) the redox polymerization initiator system, preferred is a system wherein ammonium persulfate, sodium hydroxymethane sulfinate, disodium ethylenediamine tetraacetate dihydrate and ferrous sulfate are used in combination, a system wherein potassium permanganate and oxalic acid are used in combination, a system wherein potassium bromate and ammonium sulfite are used in combination, or a system wherein ammonium persulfate and ammonium sulfite are used in combination. Among them, particularly preferred is a system wherein ammonium persulfate, sodium hydroxymethane sulfinate (also called Rongalite catalyst), disodium ethylenediamine tetraacetate dihydrate and ferrous sulfate are used in combination.

(Emulsion Polymerization Step)

The emulsion polymerization step may be conducted by a known emulsion polymerization method. For example, it may be conducted by the following procedure.

Firstly, a pressure-resistant reactor is deaerated, and then, into the reactor, an aqueous medium, an emulsifier, a radical polymerization initiator, if necessary a pH-adjusting agent, and, in a redox polymerization initiator system, a redox catalyst, are charged. Then, after raising the temperature to a predetermined polymerization temperature, monomers are supplied. Further, if necessary, a catalyst (e.g. a Rongalite catalyst in the case of the redox polymerization initiator system) is supplied. When the polymerization initiator is activated and the polymerization reaction is initiated, the pressure in the reactor begins to decrease. That is, the initiation (the starting point of the reaction time) of the polymerization reaction can be confirmed by the decrease of the pressure.

After confirming the decrease of the pressure in the reactor, monomers are additionally supplied, and while maintaining the predetermined polymerization temperature and polymerization pressure, the polymerization reaction is conducted to form a fluorinated copolymer. By gradually supplying the respective monomers while the polymerization reaction is made to proceed, dispersion of the copolymer composition can be reduced.

In the polymerization reaction period, when the total amount of the additionally supplied monomer mixture has reached a predetermined value, the interior of the reactor is cooled to stop the polymerization reaction (the terminal point of the reaction time), to obtain a fluorinated copolymer latex. The fluorinated copolymer latex thus obtained contains particles of the fluorinated copolymer and the emulsifier in the aqueous medium.

In the case of (1) the heat decomposition polymerization initiator system, the polymerization temperature during the polymerization reaction period is preferably from 50° C. to 100° C., more preferably from 60° C. to 90° C., particularly preferably from 65° C. to 80° C. When the polymerization temperature is within such a range, the polymerization rate will be proper and can easily be controlled, the productivity will be excellent, and favorable stability of the latex will be readily obtainable.

The polymerization pressure during the polymerization reaction period is preferably from 1.0 to 10 MPaG, more preferably from 1.5 to 5.0 MPaG, particularly preferably from 1.7 to 3.0 MPaG. If the polymerization pressure is less than 1.0 MPaG, the polymerization rate may be too low. When the polymerization pressure is within the above range, the polymerization rate will be proper and can easily be controlled, and the productivity will be excellent.

In the case of (2) the redox polymerization initiator system, the polymerization temperature during the polymerization reaction period is preferably from 0° C. to 100° C., more preferably from 10° C. to 90° C., particularly preferably from 20° C. to 60° C. When the polymerization temperature is within such a range, the polymerization rate will be proper and can easily be controlled, the productivity will be excellent, and favorable stability of the latex will be readily obtainable.

The polymerization pressure during the polymerization reaction period is preferably from 1.0 to 10 MPaG, more preferably from 1.5 to 5.0 MPaG, particularly preferably from 1.7 to 3.0 MPaG. If the polymerization pressure is less than 1.0 MPaG, the polymerization rate may be too low. When the polymerization pressure is within the above range, the polymerization rate will be proper and can easily be controlled, and the productivity will be excellent.

The average particle size of particles made of the fluorinated copolymer contained in the fluorinated copolymer latex is preferably from 20 to 200 nm, more preferably from 30 to 150 nm, further preferably from 50 to 150 nm, particularly preferably from 50 to 100 nm. When the average particle size is at least 20 nm, the entire electrode active material surface will not be densely covered with the fluorinated copolymer, and an increase of the internal resistance can be suppressed. Further, when the average particle size is at most 200 nm, a favorable bonding force of the electrode active material tends to be readily obtainable. The average particle size of the copolymer particles may be adjusted by a known method e.g. by adjusting the type, amount, etc. of the emulsifier.

Here, the average particle size of particles of the fluorinated copolymer in this specification is a value measured by a dynamic light scattering method by means of a laser zeta electrometer ELS-8000 manufactured by Otsuka Electronics Co., Ltd.

<Binder Composition for Storage Battery Device>

The binder composition for a storage battery device (hereinafter sometimes referred to simply as the binder composition) of the present invention comprises a binder for a storage battery device comprising a fluorinated copolymer and a liquid medium.

The liquid medium is preferably the above organic solvent or an organic solvent in which the fluorinated copolymer is dissolved. Such an organic solvent may, for example, be a fluorinated hydrocarbon, a chlorinated hydrocarbon, a fluorochloro hydrocarbon, an alcohol or a hydrocarbon.

The binder composition of the present invention is preferably in a state of a latex in which particles made of the fluorinated copolymer are dispersed in the aqueous medium, in view of easy handling in the production step and in that the particles comprising the fluorinated copolymer are relatively stably dispersed.

The proportion of the fluorinated copolymer contained in the binder composition of the present invention is preferably from 5 to 60 mass %, more preferably from 10 to 50 mass %, particularly preferably from 15 to 35 mass %, based on the entire binder composition. When the proportion of the fluorinated copolymer in the entire binder composition is at least the lower limit value in the above range, at the time of preparing an electrode mixture by using such a binder composition mentioned hereinafter, a favorable viscosity of the electrode mixture tends to be readily obtainable, and a highly thick coating can be formed on a current collector.

When the proportion of the fluorinated copolymer is at most the upper limit value in the above range, at the time of preparing an electrode mixture by dispersing an electrode active material, etc. in the binder composition, favorable dispersion stability tends to be readily obtainable, and a favorable coating property of the electrode mixture tends to be readily obtainable.

The method for producing the binder composition of the present invention is not particularly limited, but the fluorinated copolymer may be produced by e.g. the above-mentioned suspension polymerization, emulsion polymerization or solution polymerization, and the composition in such a state that the fluorinated copolymer after the polymerization is suspended in a suspension polymerization medium, emulsified and dispersed in the aqueous medium or dissolved in an organic solvent, may be used as it is. In such a case, the solvent or the dispersion medium such as the aqueous medium in the polymerization will be the liquid medium constituting the above-mentioned binder composition of the present invention. Further, the composition obtained by polymerization may be used as diluted with a liquid medium such as water or an organic solvent.

In a case where the composition obtained by polymerization is used as it is or as diluted, as the binder composition of the present invention, preferred is the fluorinated copolymer obtained by emulsion polymerization in a state dispersed in an aqueous medium, that is, the latex or one having the latex diluted with an aqueous medium. In such a case, the binder composition of the present invention may contain components other than the aqueous medium, such as the emulsifier, initiator, pH-adjusting agent, etc. used at the time of producing the fluorinated copolymer.

Otherwise, the binder composition of the present invention may be a composition obtainable by isolating the fluorinated copolymer in a state of a solid by flocculation and purification from the fluorinated copolymer latex obtained by the polymerization, and dissolving the solid again in an organic solvent or dispersing it again in an aqueous dispersion medium.

In the binder composition of the present invention, the content of components other than the fluorinated copolymer and the aqueous medium is preferably at most 10 mass %, more preferably at most 1 mass %.

<Electrode Mixture for Storage Battery Device>

The electrode mixture for a storage battery device (sometimes referred to simply as "the electrode mixture" in this specification) of the present invention contains an electrode active material in addition to the binder composition of the present invention. If necessary, it may contain an electrically conductive material and other components.

The electrode active material to be used in the present invention is not particularly limited, and a known material may suitably be used.

As a positive electrode active material, a metal oxide such as $MnO_2$, $V_2O_5$ or $V_6O_{13}$; a metal sulfide such as $TiS_2$, $MoS_2$ or FeS; a lithium composite metal oxide containing a transition metal element such as Co, Ni, Mn, Fe or Ti, such as $LiCoO_2$, $LiNiO_2$ or $LiMn_2O_4$; or a compound having a part of the transition metal element in such a compound substituted by another metal; may be exemplified. Further, an electrically conductive polymer material such as polyacetylene or poly-p-phenylene may also be used. Still further, one having a part or whole of the surface thereof covered with a carbon material or an inorganic compound may also be used.

As a negative electrode active material, a carbide of a polymer compound such as coke, graphite, mesophase pitch microspheres, a phenol resin or polyparaphenylene; or a carbonaceous material such as vapour-grown carbon fibers or carbon fibers, may, for example, be mentioned. Further, a metal such as Si, Sn, Sb, Al, Zn or W which may be alloyed with lithium, may also be mentioned. As an electrode active material, one having an electrically conductive material deposited on a surface by a mechanical modification method may also be used.

In the case of an electrode mixture for a lithium-ion secondary battery, the electrode active material to be used, may be one capable of reversibly introducing and discharging lithium ions by applying an electric potential in an electrolyte, and either an inorganic compound or an organic compound may be used.

It is particularly preferred to incorporate an electrically conductive material to an electrode mixture to be used for the production of a positive electrode. By incorporating an electrically conductive material, the electrical contact in the electrode active material is improved to lower the electrical resistance in the active material layer, whereby the discharge rate of a non-aqueous secondary battery may be improved.

The electrically conductive material may, for example, be an electrically conductive carbon such as acetylene black, ketjen black, carbon black, graphite, vapour-grown carbon fibers or carbon nanotubes.

It is preferred that the electrode mixture contains an electrically conductive material, since the effect to reduce the electrical resistance is large with an addition of a small amount of an electrically conductive material.

As other components, components known for an electrode mixture may be used. Specific examples include water-soluble polymers such as carboxymethyl cellulose, polyvinyl alcohol, polyacrylic acid and polymethacrylic acid.

The proportion of the electrode active material in the electrode mixture of the present invention is preferably from 20 to 90 mass %, more preferably from 30 to 80 mass %, particularly preferably from 40 to 70 mass %.

The proportion of the fluorinated copolymer in the electrode mixture is preferably from 0.1 to 20 mass %, more preferably from 0.5 to 10 mass %, particularly preferably from 1 to 8 mass %.

Further, in a case where the electrode mixture contains an electrically conductive material, the proportion of the electrically conductive material in the electrode mixture is preferably higher than 0 mass % and at most 20 mass %, more preferably from 1 to 10 mass %, particularly preferably from 3 to 8 mass %.

The solid content concentration in the electrode mixture is preferably from 30 to 95 mass %, more preferably from 40 to 85 mass %, particularly preferably from 45 to 80 mass %.

<Electrode for Storage Battery Device>

The electrode for a storage battery device of the present invention comprises a current collector and, formed on the current collector, an electrode active material layer comprising the binder for a storage battery device of the present invention and an electrode active material.

The current collector is not particularly limited so long as it is made of an electrically conductive material, and it may usually be a metal foil, a metal net or a metal madreporite, of e.g. aluminum, nickel, stainless steel or copper. As a positive electrode current collector, aluminum is preferably used, and as a negative electrode current collector, copper is preferably used. The thickness of the current collector is preferably from 1 to 100 µm.

As a method for producing the electrode for a storage battery device, for example, the electrode mixture of the present invention is applied at least on one surface, preferably on both surfaces of a current collector, followed by drying to remove a liquid medium in the electrode mixture thereby to form an electrode active material layer. If necessary, the electrode active material layer after the drying may be pressed to a desired thickness.

As a method for applying the electrode mixture to the current collector, various coating methods may be mentioned. For example, a doctor blade method, a dipping method, a reverse roll method, a direct roll method, a gravure method, an extrusion method and a brushing method may be mentioned. The coating temperature is not particularly limited, but usually a temperature in the vicinity of room temperature is preferred. The drying may be carried out by means of various drying methods, e.g. a warm air, hot air or low wet air drying method, a vacuum drying method and a drying method by irradiation with (far) infrared rays, electron rays, etc. The drying temperature is not particularly limited, but by a heating type vacuum drier, etc., a temperature of from room temperature to 200° C. is usually preferred. The pressing method may be carried out by means of a die press or a roll press.

<Lithium-Ion Secondary Battery>

A lithium-ion secondary battery as a storage battery device has the electrode for a storage battery device of the present invention as an electrode of at least one of the positive electrode and the negative electrode and has an electrolytic solution. Further, it preferably has a separator.

The electrolytic solution comprises an electrolyte and a solvent. As the solvent, an aprotic organic solvent, e.g. an alkyl carbonate such as dimethyl carbonate (DMC), ethylene carbonate (EC), diethyl carbonate (DEC), propylene carbonate (PC), butylene carbonate (BC) or methylethyl carbonate (MEC); an ester such as y-butyrolactone or methyl formate; an ether such as 1,2-dimethoxyethane or tetrahydrofuran; or a sulfur-containing compound such as sulfolane or dimethyl sulfoxide; may be used. Particularly preferred is dimethyl carbonate, ethylene carbonate, propylene carbonate, diethyl carbonate or methylethyl carbonate, whereby a high ion conductivity is obtainable, and the useful temperature range is wide. These solvents may be used alone, or at least two of them may be used as mixed.

The electrolyte may be a lithium salt such as $LiClO_4$, $LiBF_4$, $LiPF_6$, $LiAsF_5$, $CF_3SO_3Li$ or $(CF_3SO_2)_2NLi$.

EXAMPLES

Now, the present invention will be described with reference to Examples, but it should be understood that the present invention is by no means limited to these Examples. The tests and evaluations in Examples and Comparative Examples were conducted by the following methods.

(1) Copolymer Composition of Fluorinated Copolymer

A fluorinated copolymer latex produced in each Example was added to a 1.5 mass % calcium chloride aqueous solution and salted out to flocculate and precipitate a fluorinated copolymer, which was washed with deionized water and then dried for 15 hours in an oven of 100° C. to obtain a fluorinated copolymer.

The copolymer composition of the obtained fluorinated copolymer was calculated by results of melt NMR analysis, a fluorine content analysis and an infrared absorption spectrum analysis.

(2) Adhesion (Peel Strength)

An electrode (positive electrode) produced in each Example was cut in a strip form of 2 cm in width×10 cm in length and fixed so that the coating film surface of the electrode mixture faced upward. An adhesive tape was bonded to the coating film surface of the electrode mixture, and the adhesive tape was peeled in a 90° direction at a rate of 10 mm/min, whereby the strength (N) was measured. The measurement was repeated 5 times, and the average value was taken as the peel strength. The larger the value, the better the adhesion (bonding property) by the binder. That is, it indicates that the adhesion in the electrode active material and the adhesion between the electrode active material and the current collector bonded by the binder are excellent.

(3) Electrolytic Solution Resistance (Degree of Swelling)

A fluorinated copolymer was obtained by the method disclosed in the above (1) from the fluorinated copolymer latex obtained in each Example.

The electrolytic solution resistance was calculated from the degree of swelling when the obtained fluorinated copolymer was immersed in an electrolytic solution at high temperature (50° C.). The degree of swelling was obtained from the following formula in such a manner that the fluorinated copolymer was immersed for 168 hours in a mixed liquid of ethylene carbonate/ethyl methyl carbonate=50/50 (vol %) at 50° C., the electrolytic solution was removed by decantation, the weight Ws of the fluorinated copolymer which swelled by the electrolytic solution was measured, then the fluorinated copolymer was vacuum dried at 100° C. for 8 hours and then cooled to room temperature, and the dry weight Wd was measured.

Degree of swelling=$Ws/Wd$ (4) Charge and Discharge Cycle Characteristics

Evaluation of the charge and discharge characteristics of a secondary battery was conducted by the following method.

A positive electrode produced in each Example was cut out in a circular form with a diameter of 18 mm, and a lithium metal foil having the same area as the circular form, and a separator made of polyethylene were laminated in a 2016 type coin cell in the order of the lithium metal foil, the separator and the positive electrode to prepare a battery element. A non-aqueous electrolytic solution of a 1 M-LiPF6 ethylmethyl carbonate/ethylene carbonate (volume ratio: 1:1) was added thereto, and the cell was closed to obtain a coin type non-aqueous electrolytic solution secondary battery.

At 60° C., charging was carried out at a constant current corresponding to 0.2 C to 4.5V (the voltage represents a voltage against lithium), and charging was further carried out until the current value became 0.02 C at the charging upper limit voltage, and then, discharging was carried out at a constant current corresponding to 0.2 C to 3V, to complete a cycle. The capacity retention rate (unit: %) of the discharge capacity at the 100th cycle to the discharge capacity at the first cycle was obtained and used as an index for measurement of the charge and discharge of the battery. The higher the value of the capacity retention rate, the more excellent.

Here, 10 represents a current value to discharge a standard capacity of a battery in one hour, and 0.2 C represents a current value of ⅕ thereof.

(5) Discharge Rate Characteristics

Using a coin type non-aqueous electrolytic solution secondary battery prepared in the same manner as for the charge and discharge characteristic test, at 60° C., charging was carried out at a constant current corresponding to 0.2 C to 4.5V (the voltage represents a voltage against lithium), and charging was further carried out until the current value became 0.02 C at the charging upper limit voltage, and then, discharging was carried out at a constant current corresponding to 0.2 C to 3V. Then, discharging was carried out in the same manner as mentioned above, and discharging was carried out at a constant current corresponding to 3 C to 3V, whereby the discharge rate characteristics were evaluated. The retention rate of the discharge capacity after 3 C discharge based on the discharge capacity after 0.2 C discharge of 100% was calculated based on the following formula to obtain the initial discharge capacity ratio. The higher the initial discharge capacity ratio, the smaller the resistance in the electrode and the more excellent.

Discharge capacity ratio (%)=(3 C discharge capacity/0.2 C discharge capacity)×100

Then, using the battery subjected to 100 charge and discharge cycles in the charge and discharge characteristic test (4), 3 C discharge was carried out in the same manner as above, and the discharge capacity ratio after 100 cycles was calculated. A higher discharge capacity ratio after 100 cycles means that an increase of the resistance in the electrode is suppressed even after the charge and discharge cycles.

Example 1

Production of Fluorinated Copolymer A

In this Example, a redox polymerization initiator was used.

That is, the interior of a stainless steel pressure resistant reactor having an internal capacity of 3200 mL and equipped with stirring anchor vanes, was deaerated, and then, to the reactor, 1,700 g of deionized water, 13.3 g of sodium lauryl sulfate as an emulsifier, 60 g of disodium hydrogenphosphate dodecahydrate and 0.9 g of sodium hydroxide, as pH-adjusting agents, and 4.4 g of ammonium persulfate (one hour half-life temperature: 82° C.) as an initiator, were added. Further, an aqueous solution having 0.4 g of disodium ethylenediamine tetraacetate dihydrate (hereinafter referred to as EDTA) as a redox catalyst and 0.3 g of ferrous sulfate heptahydrate dissolved in 200 g of deionized water, was added to the reactor. The pH of the aqueous medium in the reactor was 9.2 at that time.

Then, at 40° C., a monomer mixture gas of TFE/P=88/12 (molar ratio) was injected under pressure so that the internal pressure of the reactor became 2.50 MPaG. By rotating anchor vanes at 300 rpm, sodium hydroxymethane sulfinate dihydrate (hereinafter referred to as Rongalite) having the pH adjusted to 10.0 with sodium hydroxide, was added to the reactor to initiate a polymerization reaction.

While the polymerization temperature was maintained at 40° C., and a monomer mixture gas of TFE/P=56/44 (molar ratio) was optionally injected by the self pressure, the internal pressure of the reactor was maintained at about 2.50 MPaG to continue the polymerization reaction.

Then, when the injected amount of the monomer mixture gas of TFE/P became 10 g, 0.1 mL of a divinyl adipate/tert-butanol=17/83 (mass ratio) solution was injected into the reactor by nitrogen back pressure. Thereafter, until the injected amount of the TFE/P monomer mixture gas reached 690 g, 0.1 mL of the tert-butanol solution of divinyl adipate was injected every 10 g, and totally 6.9 mL was injected. When the total amount of the injected amount of the TFE/P monomer mixture gas became 700 g, the internal temperature of the reactor was cooled to 10° C. to obtain a latex of a fluorinated elastic copolymer A. The polymerization time was 6 hours. The content of the fluorinated copolymer A in the latex was 29 mass %.

The copolymer composition of the fluorinated copolymer A was such that the ratio of TFE (A) to P (B) i.e. (A)/(B)= 56/44 (molar ratio), and the molar ratio of divinyl adipate (C) to the total amount of all the structural units excluding the structural units (C) (i.e. the total amount of TFE (A) and P (B)) i.e. [(C)/{(A)+(B)}] was 0.05/100.

Further, divinyl adipate remaining in the latex was not detected by gas chromatography, and absorption based on a carbon-carbon double bond in the vicinity of 1700 $cm^{-1}$ was not confirmed in an infrared absorption spectrum of the fluorinated copolymer A, and accordingly it is estimated that all the two carbon-carbon double bonds in the structural units derived from divinyl adipate were reacted and copolymerized.

Physical properties (Mooney viscosity and the average particle size) of the fluorinated copolymer A are shown in Table 1.

By using the obtained fluorinated copolymer A latex as a binder composition, an electrode mixture was prepared.

That is, 100 parts by mass of $LiNi_{0.5}Co_{0.2}Mn_{0.3}O_2$ (trade name "Selion L" manufactured by AGC Seimi Chemical Co., Ltd, tap density: 2.4 $g/cm^3$, average particle size: 12 μm) as a positive electrode active material and 7 parts by mass of acetylene black as an electrically conductive material, were mixed, and as a viscosity-adjusting agent, 40 parts by mass of a carboxymethyl cellulose aqueous solution having a concentration of 1 mass % was added, followed by kneading, and then, 10 parts by mass of the fluorinated copolymer A latex was added thereto to obtain an electrode mixture 1.

The obtained electrode mixture 1 was applied to an aluminum foil (current collector) having a thickness of 15 μm by means of a doctor blade, so that the thickness after drying would be 60 μm, then dried in a vacuum drier at 120° C. and then pressed by a roll press to a thickness of 40 μm to obtain a positive electrode 1.

By the above-mentioned methods, the adhesion, electrolytic solution resistance and charge and discharge characteristics were evaluated. The evaluation results are shown in Table 1 (the same applies hereinafter).

Example 2

Production of Fluorinated Copolymer B

In this Example, the amount of addition of the divinyl adipate/tert-butanol solution in Example 1 was changed.

That is, a latex of a fluorinated copolymer B was obtained in the same manner as in Example 1 except that 0.5 mL of the same divinyl adipate/tert-butanol solution was injected into the reactor by nitrogen back pressure every 10 g of the injected amount of the TFE/P monomer mixture gas into the reactor, and totally 34.5 mL was injected. The content of the fluorinated copolymer B in the latex was 29 mass %. The copolymer composition and physical properties of the fluorinated copolymer B are shown in Table 1.

In the same manner as in Example 1, an electrode mixture 2 and an electrode 2 were prepared and evaluated in the same manner.

Example 3

Production of Fluorinated Copolymer C

In this Example, a heat decomposition type polymerization initiation system was employed, and the polymerization temperature was 75° C.

That is, a latex containing a fluorinated copolymer C was obtained in the same manner as in Example 1 except that EDTA and ferrous sulfate heptahydrate were not used as the redox catalyst, and the polymerization temperature was 75° C. The polymerization time was 9 hours. The content of the fluorinated copolymer C in the latex was 29 mass %. The copolymer composition and physical properties of the fluorinated copolymer C are shown in Table 1.

In the same manner as in Example 1, an electrode mixture 3 and an electrode 3 were prepared and evaluated in the same manner.

Example 4

Production of Fluorinated Copolymer D

In this Example, 1,4-butandiol divinyl ether was used instead of divinyl adipate as the monomer (c).

That is, a latex of a fluorinated copolymer D was obtained in the same manner as in Example 1, except that in Example 1, the tert-butanol solution of divinyl adipate injected was changed to a 1,4-butanediol divinyl ether/tert-butanol=12/88 (mass ratio) solution. The polymerization time was 6 hours. The content of the fluorinated copolymer D in the latex was 28 mass %. The copolymer composition and physical properties of the fluorinated copolymer D are shown in Table 1.

Further, 1,4-butanediol divinyl ether remaining in the latex was not detected in gas chromatography, and absorption based on a carbon-carbon double bond in the vicinity of 1,700 cm$^{-1}$ was not confirmed in an infrared absorption spectrum of the fluorinated copolymer D, and accordingly it is estimated that all the two carbon-carbon double bonds in the structural units derived from 1,4-butanediol divinyl ether were reacted and copolymerized.

In the same manner as in Example 1, an electrode mixture 4 and an electrode 4 were prepared and evaluated in the same manner.

Example 5

Production of Fluorinated Copolymer E

In this Example, vinyl crotonate was used instead of divinyl adipate as the monomer (c).

That is, a latex of a fluorinated copolymer E was obtained in the same manner as in Example 1 except that in Example 1, the tert-butanol solution of divinyl adipate injected was changed to a vinyl crotonate/tert-butanol=9.5/90.5 (mass ratio) solution. The polymerization time was 6 hours. The content of the fluorinated copolymer E in the latex was 28 mass %.

The copolymer composition and physical properties of the fluorinated copolymer E are shown in Table 1.

Further, vinyl crotonate remaining in the latex was not detected in gas chromatography, but absorption based on a carbon-carbon double bond in the vicinity of 1,700 cm$^{-1}$ was confirmed in an infrared absorption spectrum of the fluorinated copolymer E. Thus, it is estimated that one of the two carbon-carbon double bonds in the structural units derived from vinyl crotonate was entirely reacted and copolymerized, and the other carbon-carbon double bond partially remained in an unreacted state.

Further, in the same manner as in Example 1, an electrode mixture 5 and an electrode 5 were prepared and evaluated in the same manner.

Example 6

Production of Fluorinated Copolymer F

In this Example, the amount of addition of the divinyl adipate/tert-butanol solution in Example 1 was changed.

That is, a latex of a fluorinated copolymer F was obtained in the same manner as in Example 1 except that 2 mL of the same divinyl adipate/tert-butanol solution as in Example 1 was injected into the reactor by nitrogen back pressure every 10 g of the injected amount of the TFE/P monomer mixture gas into the reactor, and totally 138.0 mL was injected. The content of the fluorinated copolymer F in the latex was 30 mass %. The copolymer composition and physical properties of the fluorinated copolymer G are shown in Table 1.

In the same manner as in Example 1, an electrode mixture 6 and an electrode 6 were prepared and evaluated in the same manner.

Example 7

Production of fluorinated copolymer K

In this Example, the monomer mixture gas and the polymerization temperature in Example 1 were changed.

That is, a latex of a fluorinated copolymer K was obtained in the same manner as in Example 1 except that a mixed gas of TFE/P/VdF=25/6/69 (molar ratio) as the monomer mixture gas injected into the reactor, was injected at 25° C. so that the internal pressure of the reactor would be 2.50 MPaG, and after the polymerization reaction started, the polymerization temperature was maintained at 25° C., and a monomer mixture gas of TFE/P/VdF=39/26/35 (molar ratio) was optionally injected by the self pressure to continue the polymerization reaction. The content of the fluorinated copolymer K in the latex was 30 mass %. The copolymer composition and physical properties of the fluorinated copolymer K are shown in Table 1.

In the same manner as in Example 1, an electrode mixture 10 and an electrode 10 were prepared and evaluated in the same manner.

Comparative Example 1

Production of Fluorinated Copolymer G

A latex of a fluorinated copolymer F was obtained in the same manner as in Example 1 except that divinyl adipate was not added. The content of the fluorinated copolymer E in the latex was 28 mass %. The copolymer composition and physical properties of the fluorinated copolymer G are shown in Table 1.

In the same manner as in Example 1, an electrode mixture 7 and an electrode 7 were prepared and evaluated in the same manner.

Comparative Example 2

Production of Fluorinated Copolymer H

A latex of a fluorinated copolymer H was obtained in the same manner as in Example 1 except that in Example 1, the composition of the divinyl adipate/tert-butanol solution injected was changed to a divinyl adipate/tert-butanol=47/53 (mass ratio) solution. The polymerization time was 6 hours. The content of the fluorinated copolymer H in the latex was 29 mass %. The copolymer composition and physical properties of the fluorinated copolymer H are shown in Table 1.

Further, divinyl adipate remaining in the latex was not detected in the gas chromatography, and absorption based on a carbon-carbon double bond in the vicinity of 1,700 cm$^{-1}$ was not confirmed in the infrared absorption spectrum of the fluorinated copolymer H, and accordingly it was suggested that both the carbon-carbon double bonds of the divinyl adipate units were entirely reacted and copolymerized.

In the same manner as in Example 1, an electrode mixture 8 and an electrode 8 were prepared and evaluated in the same manner.

Comparative Example 3

Production of Fluorinated Copolymer J

A latex of a fluorinated copolymer J was obtained in the same manner as in Example 3 except that divinyl adipate was not added. The content of the fluorinated copolymer J in the latex was 28 mass %. The copolymer composition and physical properties of the fluorinated copolymer J are shown in Table 1.

In the same manner as in Example 1, an electrode mixture 9 and an electrode 9 were prepared and evaluated in the same manner.

Comparative Example 4

Production of Fluorinated Copolymer L

A latex of a fluorinated copolymer L was obtained in the same manner as in Example 6 except that divinyl adipate was not added. The content of the fluorinated copolymer L in the latex was 30 mass %. The copolymer composition and physical properties of the fluorinated copolymer L are shown in Table 1.

In the same manner as in Example 1, an electrode mixture 11 and an electrode 11 were prepared and evaluated in the same manner.

was less likely to swell by the electrolytic solution, and provided a favorable capacity retention ratio of a secondary battery.

Whereas, in Comparative Examples 1, 3 and 4 in which the monomer (c) was not used, although favorable adhesion was obtained, the degree of swelling was high. Further, in Comparative Example 2 in which the molar ratio ((C)/{(A)+(B)}) of the structural units (C) to the total of all the structural units excluding the structural units (C) was so high as 3.5/100, although the swelling resistance was favorable, the adhesion was low.

Further, when tetrahydrofuran was added to the fluorinated copolymer obtained in each of Examples and Comparative Examples, all of the fluorinated copolymer G, the fluorinated copolymer J and the fluorinated copolymer L for which the monomer (c) was not used were completely dissolved in tetrahydrofuran, whereas the fluorinated copolymer A, the fluorinated copolymer B, the fluorinated copolymer C, the fluorinated copolymer D, the fluorinated copolymer E, the fluorinated copolymer F, the fluorinated copolymer K and the fluorinated copolymer H for which the monomer (c) was used were not completely dissolved in tetrahydrofuran. Thus, it is considered that by the structural units (C) derived from the monomer (c), the crosslinked structure in the fluorinated copolymer is formed.

INDUSTRIAL APPLICABILITY

The binder for a storage battery device of the present invention is useful as a binder for production of an electrode of a storage battery device such as a lithium-ion secondary battery.

TABLE 1

| Ex./Comp. Ex. | | Ex. 1 | Ex. 2 | Ex. 3 | Ex. 4 | Ex. 5 | Ex. 6 | Ex. 7 | Comp. Ex. 1 | Comp. Ex. 2 | Comp. Ex. 3 | Comp. Ex. 4 |
|---|---|---|---|---|---|---|---|---|---|---|---|---|
| Fluorinated copolymer | | A | B | C | D | E | F | K | G | H | J | L |
| Molar ratio of (a)/(b) | | 56/44 | 56/44 | 56/44 | 56/44 | 56/44 | 56/44 | 74/26 | 56/44 | 56/44 | 56/45 | 74/26 |
| (C)/{(A) + (B)} | | 0.05/100 | 0.25/100 | 0.05/100 | 0.05/100 | 0.05/100 | 1/100 | 0.05/100 | — | 3.5/100 | — | — |
| Mooney viscosity | | 110 | 130 | 80 | 100 | 90 | 150 | 100 | 100 | 150 | 60 | 90 |
| Average particle size (nm) | | 80 | 90 | 60 | 80 | 80 | 60 | 90 | 80 | 40 | 40 | 90 |
| Adhesion | Peel strength (N) | 1.1 | 0.8 | 1.3 | 1.1 | 0.9 | 0.6 | 1.1 | 1.1 | 0.2 | 1.2 | 1.1 |
| Electrolytic solution resistance | Degree of swelling (times) | 1.03 | 1.02 | 1.05 | 1.04 | 1.04 | 1.01 | 1.10 | 1.20 | 1.01 | 1.31 | 1.95 |
| Charge and discharge cycle characteristics | Capacity retention rate (%) | 95 | 94 | 93 | 94 | 94 | 92 | 92 | 89 | 88 | 85 | 80 |
| Charge and discharge rate characteristics (initial) | Capacity ratio (%) | 88 | 89 | 88 | 86 | 87 | 89 | 90 | 86 | 80 | 85 | 87 |
| Charge and discharge rate characteristics (after 100 cycles) | Capacitor ratio (%) | 81 | 79 | 75 | 78 | 80 | 70 | 74 | 60 | 30 | 57 | 55 |

As shown in the results in Table 1, each of the fluorinated copolymers in Examples 1 to 7 comprises structural units (C) derived from the monomer (c) within a range of the present invention. The binder for a storage battery device made of the fluorinated copolymer had a favorable adhesion, This application is a continuation of PCT Application No. PCT/JP2013/061948 filed on Apr. 23, 2013, which is based upon and claims the benefit of priority from Japanese Patent Application No. 2012-102713 filed on Apr. 27, 2012. The contents of those applications are incorporated herein by reference in their entireties.

What is claimed is:

1. An electrode mixture, comprising:
a binder composition comprising a binder and a liquid medium; and
an electrode active material,
wherein the binder comprises a fluorinated copolymer including at structural unit (A), at least one structural unit (B) and at least one structural unit (C),
a molar ratio of the structural unit (C) to a total of all structural units excluding the structural unit (C) is from 0.01/100 to 3/100,
the structural unit (A) is at least one structural unit derived from a monomer selected from the group consisting of tetrafluoroethylene, hexafluoropropylene, vinylidene fluoride and chlorotrifluoroethylene,
the structural unit (B) is at least one structural unit derived from a monomer selected from the group consisting of ethylene and propylene
the structural unit (C) is at least one structural unit derived from a monomer selected from the group consisting of $C_{5-30}$ organic compounds having a plurality of double bonds, and
at least one of the double bonds is a double bond of a vinyl ether group $CH_2=CH-O-$.

2. The electrode mixture of claim 1, wherein the monomer for the structural unit (C) is a compound of formula (I):

$$CR^1R^2=CR^3-O-R^4-O-CR^5=CR^6R^7 \qquad (I)$$

wherein each of $R^1$, $R^2$, $R^3$, $R^5$ $R^6$, and $R^7$ which are independent of one another, is a hydrogen atom, a fluorine atom or a methyl group, $R^4$ is a $C_{1-10}$ alkylene group which may contain an etheric oxygen atom, provided that at least one of the double bonds in the compound of formula (I) is a double bond of a vinyl ether group $CH_2=CH-O-$.

3. The electrode mixture of claim 1, wherein the monomer for the structural unit (C) is 1,4-butanediol divinyl ether.

4. The electrode mixture of claim 1, wherein a molar ratio (A)/(B) of the structural unit (A) to the structural unit (B) is from 30/70 to 90/10.

5. The electrode mixture of claim 1, wherein the fluorinated copolymer includes at least one structural unit derived from tetrafluoroethylene and/or vinylidene fluoride and at least one structural unit derived from propylene.

6. The electrode mixture of claim 1, wherein the fluorinated copolymer includes at least one structural unit derived from tetrafluoroethylene and at least one structural unit derived from propylene.

7. The electrode mixture of claim 1, wherein the liquid medium is an aqueous medium including a plurality of particles dispersed therein, and the particles comprise the fluorinated copolymer.

8. The electrode mixture of claim 1, wherein the molar ratio of the structural unit (C) to the total of all structural units excluding the structural unit (C) is from 0.05/100 to 0.8/100.

9. The electrode mixture of claim 1, wherein the binder further comprises a structural unit (D), which is at least one structural unit derived from perfluoro(alkyl vinyl ether).

10. An electrode mixture, comprising:
a binder composition comprising a binder and a liquid medium; and
an electrode active material,
wherein the binder comprises a fluorinated copolymer including at least one structural unit (A), at least one structural unit (B) and at least one structural unit (C),
a molar ratio of the structural unit (C) to a total of all structural units excluding the structural unit (C) is from 0.01/100 to 3/100,
the structural unit (A) is at least one structural unit derived from a monomer selected from the group consisting of tetrafluoroethylene, hexafluoropropylene, vinylidene fluoride and chlorotrifluoroethylene,
the structural unit (B) is at least one structural unit derived from a monomer selected from the group consisting of ethylene and propylene,
wherein the monomer for the structural unit (C) is divinyl adipate.

11. The electrode mixture of claim 10, wherein the molar ratio of the structural unit (C) to the total of all structural units excluding the structural unit (C) is from 0.05/100 to 0.8/100.

12. The electrode mixture of claim 10, wherein the binder further comprises a structural unit (D), which is at least one structural unit derived from perfluoro(alkyl vinyl ether).

13. The electrode mixture of claim 12, wherein the monomer for the structural unit (D) is a compound of formula (IV):

$$CF_2=CF-O-R^f \qquad (IV)$$

wherein $R^f$ is a $C_{1-8}$ perfluoroalkyl group or a $C_{1-8}$ perfluoroalkyl group having an etheric oxygen atom.

* * * * *